US012777172B2

(12) United States Patent
Na et al.

(10) Patent No.: US 12,777,172 B2
(45) **Date of Patent: *Oct. 27, 2026**

(54) VIDEO ENCODING/DECODING APPARATUS

(71) Applicant: SK TELECOM CO., LTD., Seoul (KR)

(72) Inventors: Tae Young Na, Seoul (KR); Jae-seob Shin, Seoul (KR); Sun Young Lee, Seoul (KR); Se Hoon Son, Seoul (KR); Jeong-yeon Lim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/923,254

(22) Filed: Oct. 22, 2024

(65) Prior Publication Data

US 2025/0047876 A1 Feb. 6, 2025

Related U.S. Application Data

(63) Continuation of application No. 16/960,127, filed as application No. PCT/KR2019/000152 on Jan. 4, 2019, now Pat. No. 12,160,592.

(30) Foreign Application Priority Data

Jan. 5, 2018 (KR) ........................ 10-2018-0001691
Aug. 3, 2018 (KR) ........................ 10-2018-0090596

(51) Int. Cl.
*H04N 19/00* (2014.01)
*H04N 19/176* (2014.01)
(Continued)

(52) U.S. Cl.
CPC ......... *H04N 19/186* (2014.11); *H04N 19/176* (2014.11); *H04N 19/182* (2014.11); *H04N 19/184* (2014.11); *H04N 19/50* (2014.11)

(58) Field of Classification Search
None
See application file for complete search history.

(56) References Cited

U.S. PATENT DOCUMENTS

2015/0124865 A1 5/2015 Kim et al.
2015/0264374 A1* 9/2015 Xiu ...................... H04N 19/174 375/240.25

(Continued)

FOREIGN PATENT DOCUMENTS

CN 105723707 A 6/2016
KR 10-2013-0020511 A 2/2013

(Continued)

OTHER PUBLICATIONS

Office Action dated Nov. 27, 2024 for corresponding Korean Patent Application No. 10-2018-0090596, along with an English translation (10 pages).

(Continued)

*Primary Examiner* — Zhihan Zhou
(74) *Attorney, Agent, or Firm* — Hauptman Ham, LLP

(57) ABSTRACT

Disclosed is video encoding/decoding method and apparatus using a correlation of YCbCr. According to an aspect of the present disclosure, the video decoding method for predictively decoding a target block includes, receiving a bitstream and generating a residual block for a chroma block, generating reconstructed information in a luma block corresponding to the chroma block and reconstructed neighboring information about the luma block, generating reconstructed neighboring information about the chroma block, determining a scaling value and an offset value based on the reconstructed neighboring information about the chroma block and the reconstructed neighboring information about the luma block, generating a prediction block for the chroma block by applying the determined scaling value and offset value to the reconstructed information in the luma block, and (Continued)

generating a reconstructed block for the chroma block based on the residual block for the chroma block and the prediction block for the chroma block.

12 Claims, 15 Drawing Sheets

(51) Int. Cl.

| | |
|---|---|
| ***H04N 19/182*** | (2014.01) |
| ***H04N 19/184*** | (2014.01) |
| ***H04N 19/186*** | (2014.01) |
| ***H04N 19/50*** | (2014.01) |

(56) References Cited

U.S. PATENT DOCUMENTS

| | | | | |
|---|---|---|---|---|
| 2016/0219283 | A1* | 7/2016 | Chen | H04N 19/105 |
| 2017/0244975 | A1* | 8/2017 | Huang | H04N 19/61 |
| 2018/0205946 | A1* | 7/2018 | Zhang | H04N 19/103 |
| 2019/0075293 | A1 | 3/2019 | Lim et al. | |
| 2020/0260096 | A1* | 8/2020 | Ikai | H04N 19/96 |
| 2020/0288135 | A1* | 9/2020 | Laroche | H04N 19/105 |
| 2020/0296380 | A1* | 9/2020 | Aono | H04N 19/593 |
| 2020/0413069 | A1* | 12/2020 | Lim | H04N 19/197 |

FOREIGN PATENT DOCUMENTS

| | | | |
|---|---|---|---|
| KR | 10-2016-0132990 | A | 11/2016 |
| KR | 10-2017-0071594 | A | 6/2017 |
| KR | 10-2017-0107448 | A | 9/2017 |
| KR | 10-2017-0114598 | A | 10/2017 |
| WO | 2015/139010 | A1 | 9/2015 |
| WO | 2016/066028 | A1 | 5/2016 |
| WO | 2016/123219 | A1 | 8/2016 |
| WO | 2017/164297 | A1 | 9/2017 |

OTHER PUBLICATIONS

Kai Zhang et al., "Enhanced Cross-component Linear Model Intra-prediction", Qualcomm Incorporated, JVET-D0110, 4th Meeting, Oct. 15-21, 2016 (6 pages).

Korean Office Action issued on Aug. 20, 2025, for corresponding Korean Patent Application No. 10-2018-0090596, with its English translation, 11 pages.

Huanbang Chen et al., "Description of SDR, HDR and 360° video coding technology proposal," Joint Video Exploration Team (JVET) of ITU-T SG 16 WP 3 and ISO/IEC JTC 1/SC 29/WG 11, JVET-J0025, Apr. 10-20, 2018, 135 pages, cited NPL No. 1.

International Search Report issued on Apr. 16, 2019 for corresponding international patent application No. PCT/KR2019/000152.

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11 7th Meeting, Jul. 13-21, 2017, pp. 1-45, Torino, IT; Cited in NPL No. 1.

Office Action dated Jul. 15, 2023, in connection with Chinese Patent Application No. 201980016697.2, with English machine translation (17 pages).

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, Document: JVET-G1001-v1 (50 pages); Cited in NPL No. 3.

Chinese Office Action issued on Mar. 9, 2024, in connection with the Chinese Patent Application No. 201980016697.2, with its English translation, 21 pages.

Written Opinion issued on Apr. 16, 2019 for corresponding international patent application No. PCT/KR2019/000152; with English machine translation (14 pages).

* cited by examiner (a) Chroma (b) Luma (a) Chroma (b) Luma (a) Chroma (b) Luma (a) Chroma (b) Luma (a) Chroma (b) Luma (a) Cb (b) Cr (a) Cb (b) Cr (a) Cb (b) Cr

VIDEO ENCODING/DECODING APPARATUS

CROSS-REFERENCE TO RELATED APPLICATION

The present application is a Continuation of U.S. patent application Ser. No. 16/960,127, filed on Feb. 2, 2021, which is a national stage filing under 35 U.S.C § 371 of PCT application number PCT/KR2019/000152 filed on Jan. 4, 2019 which is based upon and claims the benefit of priorities to Korean Patent Application No. 10-2018-0001691, filed on Jan. 5, 2018 and Korean Patent Application No. 10-2018-0090596, filed on Aug. 3, 2018, in the Korean Intellectual Property Office. All of the aforementioned applications are incorporated herein in their entireties by reference.

TECHNICAL FIELD

The present disclosure relates to a video encoding/decoding method and apparatus using correlation of YCbCr.

BACKGROUND ART

The statements in this section merely provide background information related to the present disclosure and may not constitute prior art.

With development of portable multimedia devices such as smartphones and tablets, users are allowed to easily acquire and store videos and even share them through social network services. Videos available through video storage and transmission, streaming services, which allow users to watch videos online in real time, or video on demand (VoD) services, which allow users to download and watch videos, are very large in data volume and are thus required to be compressed.

Video compression, which is an operation of encoding an input video considering the statistical characteristics of the video, is based on techniques such as a predictive coding technique, which removes temporal/spatial redundancy, a transformation and quantization technique based on cognitive vision, and an entropy coding technique. Among such techniques, the predictive coding technique and the transformation coding technique are representative methods of reducing the data volume by representing the same information without causing data loss.

The predictive coding technique is a compression technique that predicts a current picture to be compressed based on spatial similarity between internal pixels within the current picture, and temporal similarity between the current picture and a picture compressed at a previous time. In video compression, encoding based on temporal redundancy between pictures is called temporal prediction (or inter-prediction), and encoding based on spatial redundancy within one picture is called spatial prediction (or intra-prediction).

In the coding standard High Efficiency Video Coding (HEVC), a picture is split into square blocks for intra-prediction. Accordingly, splitting a picture into blocks of other shapes may raise an issue regarding prediction.

DISCLOSURE

Technical Problem

It is an object of the present disclosure to provide a video encoding/decoding method and apparatus for predicting a block based on a correlation of YCbCr.

SUMMARY

In accordance with one aspect of the present disclosure, provided is a video decoding method for predictively decoding a target block, including receiving a bitstream and generating a residual block for a chroma block, generating reconstructed information in a luma block corresponding to the chroma block and reconstructed neighboring information about the luma block, generating reconstructed neighboring information about the chroma block, determining a scaling value and an offset value based on the reconstructed neighboring information about the chroma block and the reconstructed neighboring information about the luma block, generating a prediction block for the chroma block by applying the determined scaling value and offset value to the reconstructed information in the luma block, and generating a reconstructed block for the chroma block based on the residual block for the chroma block and the prediction block for the chroma block.

In accordance with another aspect of the present disclosure, provided is a video decoding apparatus for predictively decoding a target block, including a predictor configured to receive a bitstream and generate a residual block for a chroma block, generate reconstructed information in a luma block corresponding to the chroma block and reconstructed neighboring information about the luma block, generate reconstructed neighboring information about the chroma block, determine a scaling value and an offset value based on the reconstructed neighboring information about the chroma block and the reconstructed neighboring information about the luma block, generate a prediction block for the chroma block by applying the determined scaling value and offset value to the reconstructed information in the luma block, and generate a reconstructed block for the chroma block based on the residual block for the chroma block and the prediction block for the chroma block.

In accordance with another aspect of the present disclosure, provided is a video decoding method for predictively decoding a target block, including receiving a bitstream and generating a residual block for a Cr block, generating reconstructed information in a Cb block corresponding to the Cr block and reconstructed neighboring information about the Cb block, generating reconstructed neighboring information about the Cr block, determining a scaling value and an offset value based on the reconstructed neighboring information about the Cr block and the reconstructed neighboring information about the Cb block, generating a prediction block for the Cr block by applying the determined scaling value and offset value to the reconstructed information in the Cb block, and generating a reconstructed block for the Cr block based on the residual block for the Cr block and the prediction block for the Cr block.

In accordance with another aspect of the present disclosure, provided is a video decoding apparatus for predictively decoding a target block, including a predictor configured to receive a bitstream and generate a residual block for a Cr block, generate reconstructed information in a Cb block corresponding to the Cr block and reconstructed neighboring information about the Cb block, generate reconstructed neighboring information about the Cr block, determine a scaling value and an offset value based on the reconstructed neighboring information about the Cr block and the reconstructed neighboring information about the Cb block, generate a prediction block for the Cr block by applying the determined scaling value and offset value to the reconstructed information in the Cb block, and generate a reconstructed block for the Cr block based on the residual block for the Cr block and the prediction block for the Cr block.

Advantageous Effects

As is apparent from the above description, according to the embodiments, the accuracy of a CCLM (Cross Component Linear Model) based intra-prediction can be improved by effectively setting reconstructed neighboring pixels.

DETAILED DESCRIPTION

Figure 1:
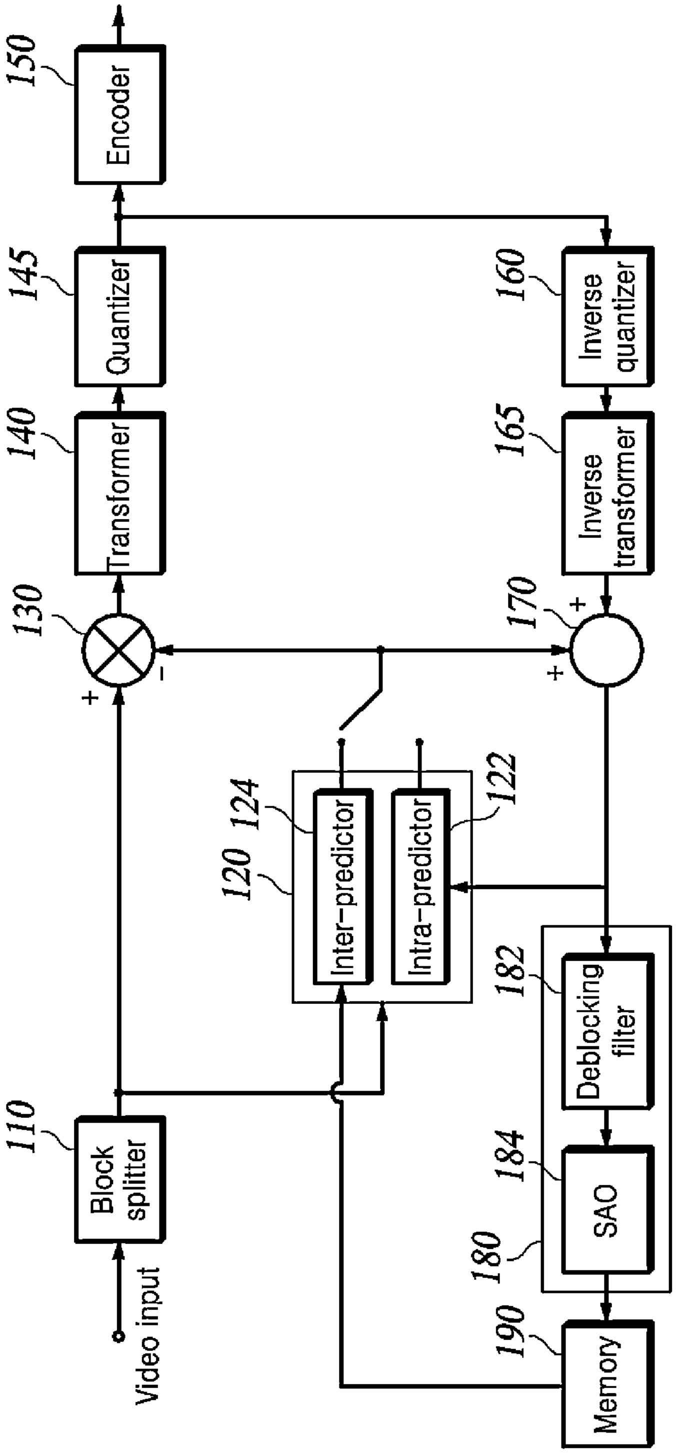
FIG. 1 is an exemplary block diagram of a video encoding apparatus capable of implementing the techniques of the present disclosure.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted to avoid obscuring the subject matter of the present invention.

Various terms such as first, second, A, B, (a), (b), etc., are used solely for the purpose of differentiating one component from the other but neither imply nor suggest the substances, order or sequence of the components. Throughout this specification, when a part "includes" or "comprises" a component, the part may further include other components, and such other components are not excluded unless there is a particular description contrary thereto. Terms such as "unit;" "module," and the like refer to units for processing at least one function or operation, which may be implemented by hardware, software, or a combination thereof.

FIG. 1 is an exemplary block diagram of a video encoding apparatus capable of implementing techniques of the present disclosure.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190. Each element of the video coding apparatus may be implemented as a hardware chip, or may be implemented as software, and one or more microprocessors may be implemented to execute the functions of the software corresponding to each element.

A video is composed of a plurality of pictures. Each picture is split into a plurality of regions, and encoding is performed for each region. For example, one picture is split into one or more slices and/or tiles, and each slice or tile is split into one or more coding tree units (CTUs). In addition, each CTU is split into one or more coding units (CUs) by a tree structure. Information applied to each CU is coded as the syntax of the CU, and information applied to CUs included in one CTU in common is coded as the syntax of the CTU. Information applied to all blocks in one slice in common is coded as the syntax of the slice, and information applied to all blocks constituting one picture is coded in a picture parameter set (PPS). Further, information referred to by a plurality of pictures in common is coded in a sequence parameter set (SPS). In addition, information referred to by one or more SPSs in common is coded in a video parameter set (VPS).

The block splitter 110 determines the size of a coding tree unit (CTU). Information about the size of the CTU (CTU size) is encoded as syntax of the SPS or PPS and is transmitted to the video decoding apparatus. The block splitter 110 splits each picture constituting the video into a plurality of CTUs of the determined size, and then recursively splits the CTUs using a tree structure. A leaf node in the tree structure serves as a coding unit (CU), which is a basic unit of coding. The tree structure may a QuadTree (QT) structure, in which a node (or parent node) is split into four sub-nodes (or child nodes) of the same size, a BinaryTree (BT) structure, in which a node is split into two sub-nodes, a TernaryTree (TT) structure, in which a node is split into three sub-nodes at a ratio of 1:2:1, or a structure employing one or more of the QT structure, the BT structure, and the TT structure. For example, a QuadTree plus BinaryTree (QTBT) structure may be used, or a QuadTree plus BinaryTree TernaryTree (QTBTTT) structure may be used.

The predictor 120 generates a prediction block by predicting a current block. The predictor 120 includes an intra-predictor 122 and an inter-predictor 124.

In general, current blocks within a picture may each be predictively coded. In general, prediction of the current blocks may be accomplished using an intra-prediction technique which uses data from a picture containing the current blocks, or an inter=prediction technique which uses data from a picture coded before the picture containing the current blocks. Inter-prediction includes both unidirectional prediction and bidirectional prediction.

The intra-predictor 122 predicts pixels in the current block using pixels (reference samples) located around the current block in the current picture in which the current block is included. There is a plurality of intra-prediction modes according to the prediction directions.

The intra-predictor 122 may determine an intra-prediction mode to be used in encoding the current block. In some examples, the intra-predictor 122 may encode the current block using several intra-prediction modes and select an appropriate intra-prediction mode to use from among the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference samples) and an equation which are determined according to the selected intra-prediction mode. Information about the selected intra-prediction mode is encoded by the encoder 150 and transmitted to the video decoding apparatus.

The inter-predictor 124 generates a prediction block for the current block through motion compensation. The inter-predictor searches for a block most similar to the current block in a reference picture encoded and decoded earlier than the current picture, and generates the prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including the information about the reference picture and a motion vector used to predict the current block is encoded by the encoder 150 and transmitted to the video decoding apparatus.

The subtractor 130 subtracts the prediction block generated by the intra-predictor 122 or the inter-predictor 124 from the current block to generate a residual block.

The transformer 140 transforms residual signals in the residual block having pixel values in the spatial domain into transform coefficients in the frequency domain. The transformer 140 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 145 quantizes the transform coefficients output from the transformer 140 and outputs the quantized transform coefficients to the encoder 150.

The encoder 150 encodes the quantized transform coefficients using a coding scheme such as CABAC to generate a bitstream. The encoder 150 encodes information such as a CTU size, a QT split flag, a BT split flag, and a split type, which are associated with block splitting, such that the video decoding apparatus splits the block in the same manner as in the video encoding apparatus.

The encoder 150 encodes information about a prediction type indicating whether the current block is encoded by intra-prediction or inter-prediction, and encodes intra-prediction information (that is, information on the intra-prediction mode) or inter-prediction information (information on the reference picture and motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference samples in performing intra-prediction of the next block in order.

The filter 180 filters the reconstructed pixels to reduce blocking artifacts, ringing artifacts, and blurring artifacts generated due to block-based prediction and transformation/quantization. The filter unit 180 may include a deblocking filter 182 and an SAO filter 184.

The deblocking filter 180 filters the boundary between the reconstructed blocks to remove blocking artifacts generated due to block-by-block encoding/decoding, and the SAO filter 184 performs additional filtering on the deblocking-filtered blocks. The SAO filter 184 is used to compensate for a difference between reconstructed pixels and original pixels caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of a block in a picture to be encoded.

Figure 2:
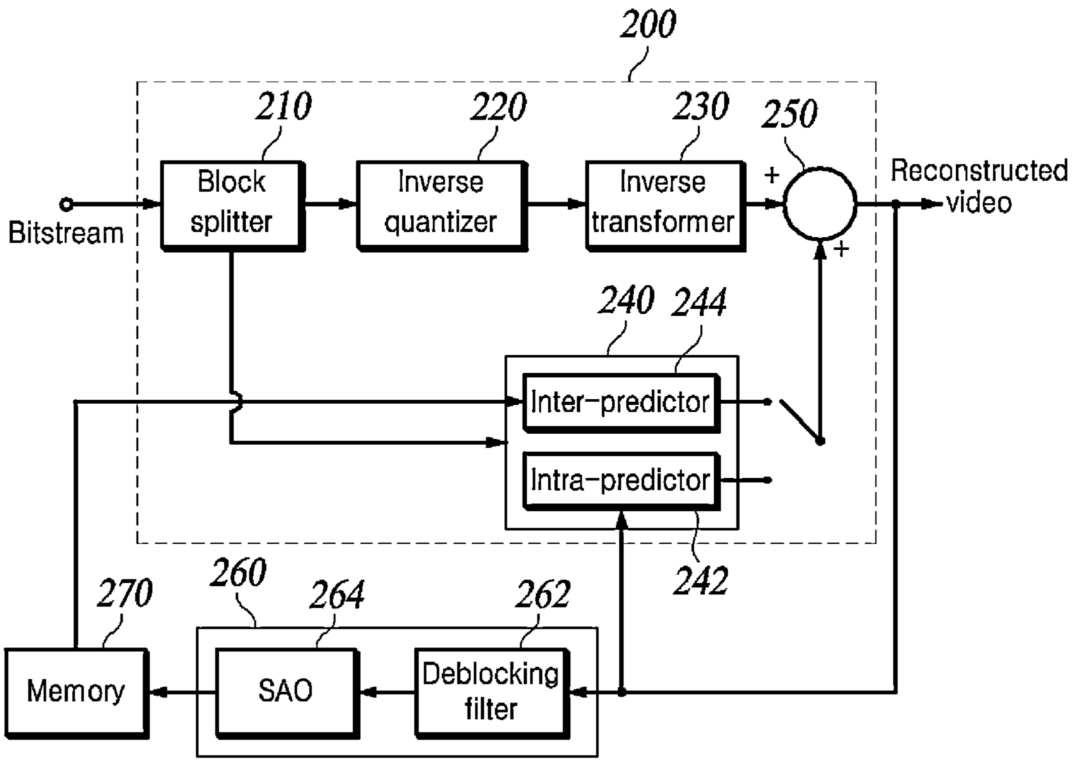
FIG. 2 is an exemplary block diagram of a video decoding apparatus capable of implementing the techniques of the present disclosure.

FIG. 2 is an exemplary block diagram of a video decoding apparatus capable of implementing the techniques of the present disclosure.

The video decoding apparatus comprises a video reconstructor 200 including a decoder 210, an inverse quantizer 220, an inverse transformer 230, a predictor 240, and an adder 250. In addition the decoding apparatus comprises a filter unit 260 and a memory 270. Similar to the video encoding apparatus of FIG. 1, each element of the video decoding apparatus may be implemented as a hardware chip, or may be implemented as software and one or more microprocessors may be implemented to execute the functions of the software corresponding to each element.

The decoder 210 decodes a bitstream received from the video encoding apparatus, extracts information related to block splitting to determine a current block to be decoded, and extracts prediction information necessary to reconstruct the current block and information about a residual signal.

The decoder 210 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts splitting information about the CTU to split the CTU using the tree structure. For example, when the CTU is split using a QTBT structure, a first flag (QT_split_flag) related to the QT split is extracted to split each node into four nodes of a lower layer. For a node corresponding to the leaf node of the QT, the second flag (BT_split_flag) and split type (split direction) information related to the split of the BT are extracted and the corresponding leaf node is split in a BT structure. As another example, when a CTU is split using the QTBTTT structure, the first flag (QT_split_flag) related to the QT split is extracted, and each node is split into four sub-nodes of a lower layer. In addition, for a node corresponding to a leaf node of QT, split_flag indicating whether the node is further split into either BT or TT and split type (or split direction) information and additional information for distinguishing the BT structure or the TT structure are extracted. Thereby, each node under the leaf node of QT is recursively split into a BT or TT structure.

Upon determining the current block to be decoded through splitting of the tree structure, the decoder 210 extracts information about the prediction type indicating whether the current block is intra-predicted or inter-predicted.

When the prediction type information indicates intra-prediction, the decoder 210 extracts a syntax element for the intra-prediction information (intra-prediction mode) about the current block.

When the prediction type information indicates inter-prediction, the decoder 210 extracts a syntax element for the inter-prediction information, namely, a motion vector and information indicating a reference picture referenced by the motion vector.

The decoder 210 extracts information about the quantized transform coefficients of the current block as information about the residual signal.

The inverse quantizer 220 inversely quantizes. the quantized transform coefficients. The inverse transformer 230 inversely transforms the inversely quantized transform coefficients from the frequency domain to the spatial domain to reconstruct the residual signals, and thereby generates a residual block for the current block.

The predictor 240 includes an intra-predictor 242 and an inter-predictor 244. The intra-predictor 242 is activated when the prediction type of the current block is intra-prediction, and the inter-predictor 244 is activated when the prediction type of the current block is inter-prediction.

The intra-predictor 242 determines an intra-prediction mode of the current block among the plurality of intra-prediction modes from the syntax element for the intra-prediction mode extracted from the decoder 210, and predicts the current block using reference pixels around the current block according to the intra-prediction mode.

The inter predictor 244 determines a motion vector of the current block and a reference picture referenced by the motion vector, using the syntax element related to the inter-prediction information extracted from the decoder 210, and predicts the current block using the determined motion vector and reference picture.

The adder 250 adds the residual block output from the inverse transformer and the prediction block output from the inter-predictor or intra-predictor to reconstruct the current block. The pixels in the reconstructed current block are utilized as reference samples for intra-prediction of a block to be decoded later.

By sequentially reconstructing the current blocks corresponding to the CUs by the video reconstructor 200, a CTU composed of the CUs and a picture composed of CTUs are reconstructed.

The filter unit 260 includes a deblocking filter 262 and an SAO filter 264. The deblocking filter 262 deblock-filters the boundary between the reconstructed blocks to remove blocking artifacts generated due to block-by-block decoding. The SAO filter 264 performs additional filtering on the reconstructed blocks after the deblock-filtering to compensate for the difference between the reconstructed pixels and the original pixels, which results from lossy coding. The reconstructed blocks filtered through the deblocking filter 262 and the SAO filter 264 are stored in the memory 270. When all the blocks in one picture are reconstructed, the reconstructed picture is used as a reference picture for inter-prediction of blocks in a subsequent picture to be decoded.

The present disclosure is directed to a prediction method according to the shape of the current block to be predicted by a predictor in the video encoding/decoding apparatus. The present disclosure relates to the Cross Component Linear Model (CCLM), which predicts a block using a correlation between channels, among various methods for generating the prediction block by predicting the current block. For example, prediction may be performed on a chroma channel using a luma channel value, or vice versa.

In the case of a color image, even when the image is converted from RGB to YCbCr, redundancy remains between the luma (Y) signal and the chroma (Cb and Cr) signals. This redundancy is called cross component redundancy, and the CCLM is a linear correlation model created to model such redundancy.

The CCLM may be broadly classified into two types. One type is to predict a chroma signal (or chroma) from a luma signal (or luma), and the other type is to predict a Cr signal (or Cr) from a Cb signal (or Cb) or to predict a Cb signal (or Cb) from a Cr signal (or Cr).

First, a method for predicting chroma from luma using the CCLM will be described.

Chroma may be obtained using luma in Equation 1 below.

$$pred_C(i,j) = \alpha \cdot rec'_L(i,j) + \beta, \qquad \text{Equation 1}$$

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)},$$

$$\beta = \frac{\sum C(n) - \alpha \cdot \sum L(n)}{N},$$

where $pred_C(i, j)$ is a value of a prediction block for a target chroma block corresponding to the current block, and $rec_L'(i, j)$ is a value obtained by down-sampling the reconstructed pixels in a target luma block corresponding to the current block. L(n) denotes the reconstructed luma pixel values of the upper and left neighbors of the current block, and C(n) denotes the reconstructed chroma pixel values of the upper and left neighbors of the current block.

In Equation 1, α (scaling value) and β (offset value) are not signaled information but obtained by calculation. That is, in order to obtain the values of α and β, reconstructed luma and chroma pixel values of neighboring (adjacent) blocks of the current block are used.

Hereinafter, a method of predicting a square block will be described.

In the present disclosure, a "reconstructed neighboring pixel value" means a value of a reconstructed pixel neighboring the current block or a value derived from values of the one or more reconstructed neighboring pixels. For example, it may be a pixel value obtained by down-sampling a plurality of the reconstructed neighboring pixels.

Figure 3:
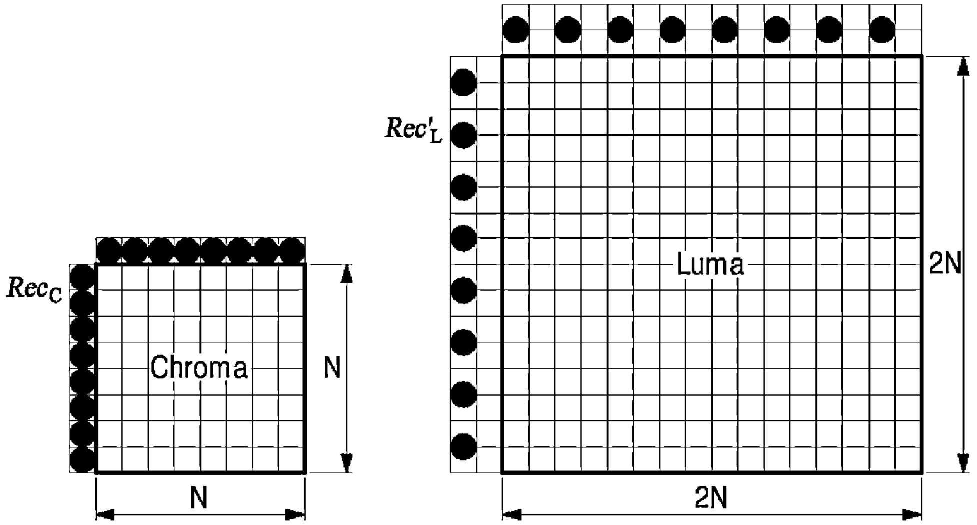
FIG. 3 is a view showing reconstructed neighboring pixel values for a target block of a square shape.

FIG. 3 is a view showing reconstructed neighboring pixels of the current block of a square shape. In the YCbCr 4:2:0 format, the luma block undergoes down-sampling due to the difference in size between the luma block and the chroma block. FIG. 3 shows 4:2:0 format where four luma (Y) pixels correspond to one chroma (Cb or Cr) pixel. However, the present disclosure is not limited thereto, and various chroma format sampling structures such as the 4:1:1 format, 4:2:2 format, and 4:4:4 format may be used. For simplicity, the present disclosure is described based on the 4:2:0 format.

Two parameters, a scaling value (a) and an offset value (p) are obtained using the correlation between reconstructed neighboring chroma pixel values and down-sampled reconstructed luma pixel values corresponding thereto, as shown in FIG. 3.

By substituting, into Equation 1, the two obtained parameters and pixel values value obtained by down-sampling the reconstructed luma pixel values within the current block, a prediction block for the chroma block may be generated. The above operation is performed for the Cb block and the Cr block, respectively.

The method of predicting chroma from luma is divided into a linear model CCLM (LM CCLM), which is a single model, and a multi-model liner model CCLM (MMLM CCLM). The LM CCLM corresponds to prediction using a single linear model, and the MMLM CCLM corresponds to prediction using two or more linear models. For example, in the MMLM CCLM, two linear models may be used based on a threshold as in Equation 2 below.

Equation 2

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases}$$

Figure 4:
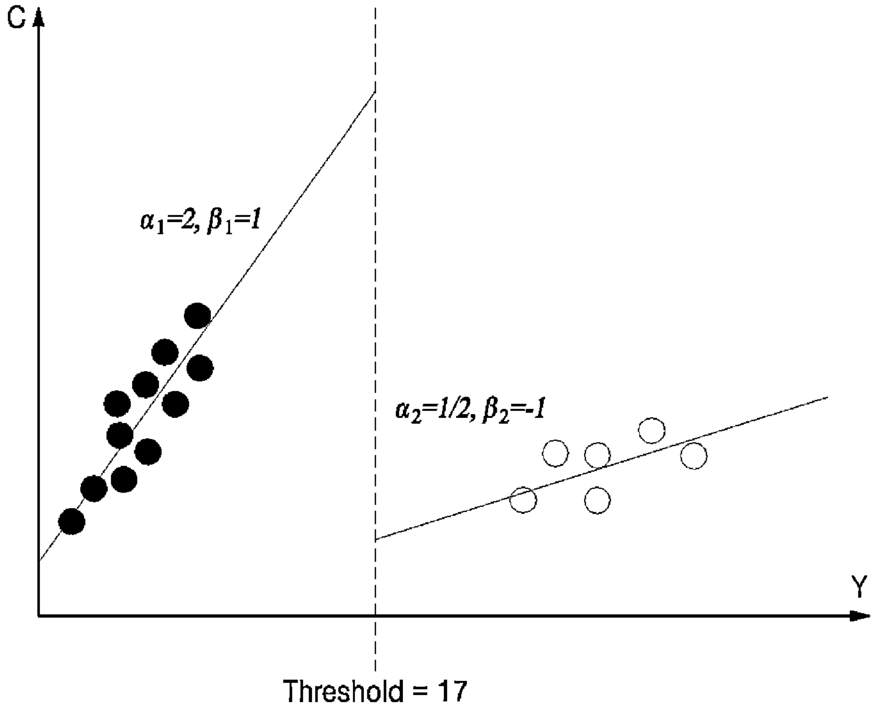
FIG. 4 illustrates an exemplary MMLM CCLM.

Here, the threshold may be set to an average of reconstructed neighboring pixel values of the target luma block. FIG. 4 illustrates an exemplary MMLM CCLM. In FIG. 4, the horizontal axis represents reconstructed neighboring luma pixel values, and the vertical axis represents reconstructed neighboring chroma pixel values. In FIG. 4, the threshold is 17, and two different linear models are implemented based on the threshold of 17.

When chroma is predicted from luma by a sampling format such as YCbCr 4:2:0, down-sampling for the luma block is used. The most basic down-sampling method is to use a 6-tap filter. The 6-tap filter may be obtained by Equation 3 below.

Equation 3

$$Rec'_L[x, y] = (6 \times Rec_L[2x, 2y] + 2 \times Rec_L[2x, 2y+1] + Rec_L[2x-1, 2y] + Rec_L[2x+1, 2y] + Rec_L[2x-1, 2y+1] + Rec_L[2x+1, 2y+1] + 4) \gg 3$$

In addition to the 6-tap filter, a down-sampling method employing 2-tap filters of Equation 4 to Equation 6 or a 4-tap filter of Equation 7 may be used.

$$Rec'_L[x, y] = (Rec_L[2x, 2y] + Rec_L[2x+1, 2y] + 1) \gg 1 \quad \text{Equation 4}$$

$$Rec'_L[x, y] = (Rec_L[2x+1, 2y] + Rec_L[2x+1, 2y = 1] + 1) \gg 1 \quad \text{Equation 5}$$

$$Rec'_L[x, y] = (Rec_L[2x, 2y+1] + Rec_L[2x+1, 2y+1] + 1) \gg 1 \quad \text{Equation 6}$$

$$Rec'_L[x, y] = (Rec_L[2x, 2y] + Rec_L[2x, 2y+1] + Rec_L[2x+1, 2y] + Rec_L[2x = 1.2y+1] + 2) \gg 2 \quad \text{Equation 7}$$

The LM CCLM and MMLM CCLM employ one of the aforementioned filters to down-sample the reconstructed neighboring luma pixels. In general, the LM CCLM employs a 6-tap filter, and the MMLM CCLM employs a 6-tap filter and one of the four types of filters of Equations 4 to 7.

Figure 5:
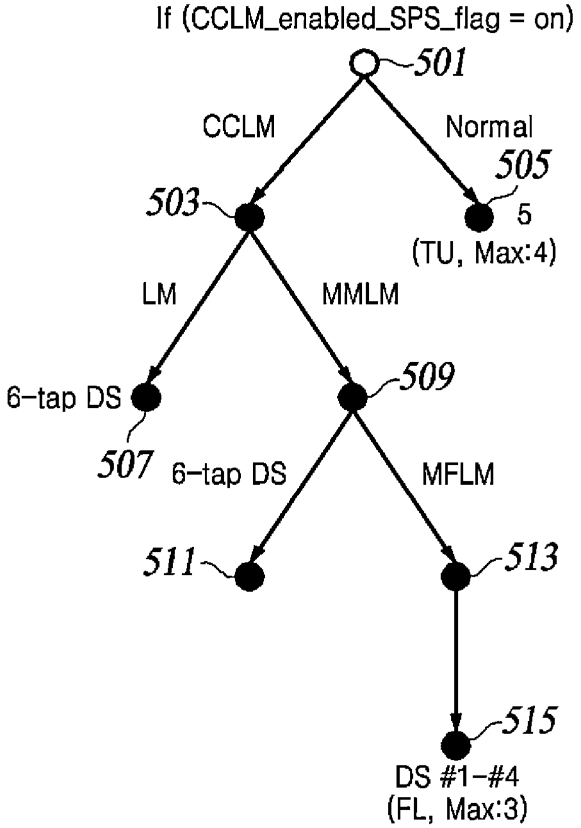
FIG. 5 illustrates a method for representing an intra-mode used for prediction.

FIG. 5 illustrates a method for representing an intra-mode used for prediction.

Initially, it is indicated whether the CCLM is used, using a flag (for example, CCLM_enabled_SPS_flag) (501). Here, the flag may be defined at one or more positions of VPS, SPS, PPS, slice header, and/or CTU header.

When the CCLM is not used, the normal intra-prediction mode is encoded and indicated (505). Here, the normal mode may represent one of five modes in a truncated unary manner.

When the CCLM is used, it is indicates whether the CCLM is LM or MMLM (503). Alternatively, either LM or MMLM may be decided by a variance of the reconstructed neighboring pixel values of the luma block. In other words, when the variance is greater than a specific threshold, the MMLM mode may be selected. When the variance value is less than the threshold, the LM mode may be selected.

In the case of LM CCLM, a 6-tap filter may be used (507).

In the case of MMLM CCLM, it is indicated whether a 6-tap filter or another filter is used (509).

When the 6-tap filter is indicated in the MMLM CCLM, the MMLM CCLM may employ a 6-tap filter (511).

When another filter is indicated in the MMLM CCLM, a filter to be used among the four filters is indicated in a fixed length manner (513).

It may be seen which of the four filters is used in the MMLM CCLM (515).

Figure 6:
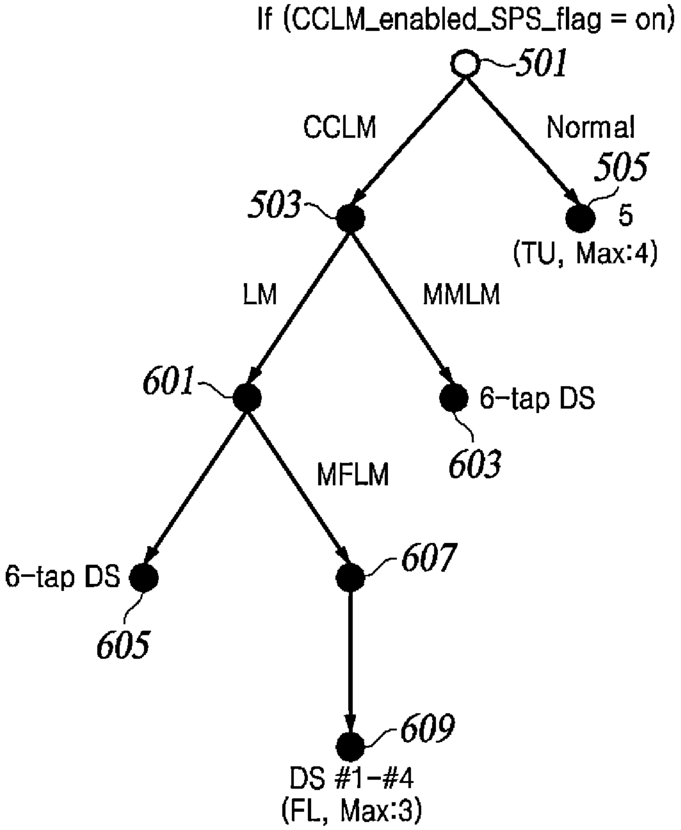
FIG. 6 illustrates a method for representing an intra-mode used for prediction among different types of CCLMs, using a diagram as shown in FIG. 5.

FIG. 6 illustrates a method for representing an intra-mode used for prediction among different types of CCLMs, using a diagram as shown in FIG. 5.

For the types of CCLMs to be used in FIG. 6, the MMLM CCLM employs a 6-tap filter, and the LM CCLM employs a 6-tap filter and one of the four other types of filters (Equations 4 to 7).

Similar to the example of FIG. 5, it is indicated whether a CCLM is used, using a flag (for example, CCLM_enabled-_SPS_flag) (501). Here, the flag may be defined at one or more positions of VPS, SPS, PPS, slice header, and/or CTU header. When the CCLM is not used, the normal intra-prediction mode is coded and indicated (505). Here, the normal mode may represent one of five modes in a truncated unary manner.

When the CCLM is used, it is indicates whether the CCLM is LM or MMLM (503). Alternatively, wither LM or MMLM may be selected by a variance of the reconstructed neighboring pixel values of the luma block. In other words, when the variance is greater than a specific threshold, the MMLM mode may be selected. When the variance is less than the threshold, the LM mode may be selected.

In the case of MMLM CCLM, a 6-tap filter may be used (603).

In the case of LM CCLM, it is indicated whether a 6-tap filter or another filter is used (601).

When the 6-tap filter is indicated in the LM CCLM, the LM CCLM may employ a 6-tap filter (605).

When another filter is indicated in the LM CCLM, a filter to be used among the four filters is indicated in a fixed length manner (607).

It may be seen which of the four filters is used in the LM CCLM (609).

Hereinafter, a method of predicting chroma from luma according to the present disclosure will be described in detail. Specifically, a method of selecting reconstructed neighboring pixels for predicting a block will be described in detail.

Figure 7:
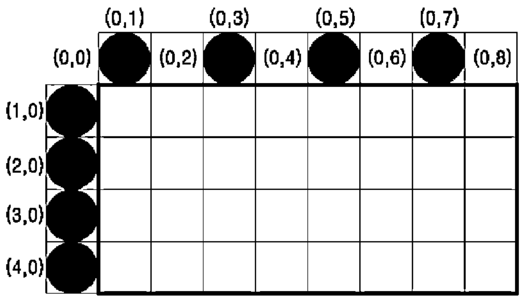
FIG. 7 shows samples used for a CCLM in predicting a block according to a first embodiment of the present disclosure.
Figure 7:
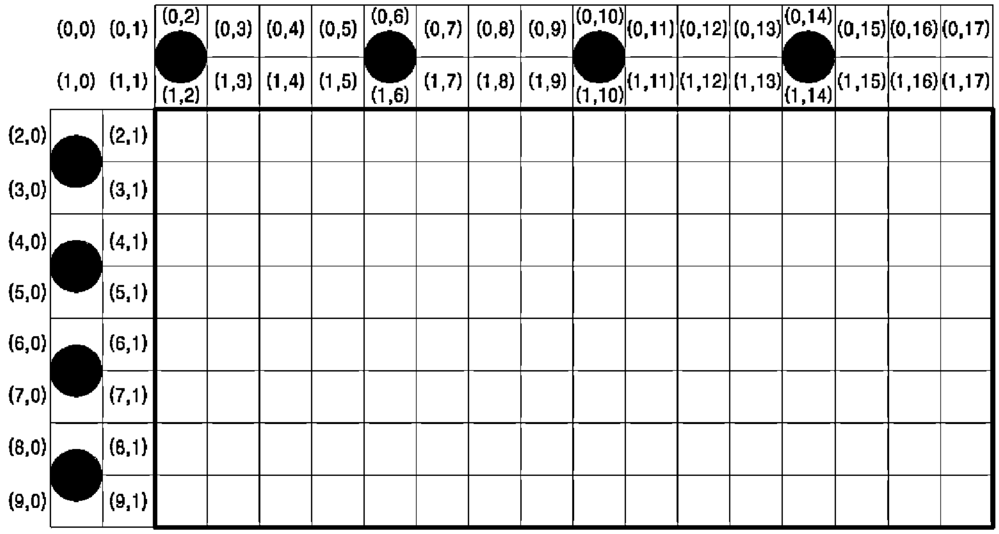

FIG. 7 shows samples used for a CCLM in predicting a block according to a first embodiment of the present disclosure. In the first embodiment, the sampling number of reconstructed pixels is determined based on the smaller one of the width and height of a chroma block.

In FIG. 7, (a) shows a chroma block, and (b) shows a luma block. According to the first embodiment of the present disclosure, in Equation 1, N may be set to twice the smaller one of the width and height of the chroma block. When the width and height of the chroma block are equal to each other, N may be set to any of the width and the height. In FIG. 7, since the height of the chroma block is less than the width thereof, N is twice the height of the chroma block. In FIG. 7, samples employed for the CCLM according to the first embodiment of the present disclosure are indicated by circles (○). Referring to FIG. 7, since the height of the chroma block is less than the width thereof, all the reconstructed neighboring pixel values on the left side are used, while only a portion of the reconstructed neighboring pixel values on the upper side may be used through a subsampling operation. For example, only odd-numbered (or even-numbered) reconstructed pixel values among the reconstructed neighboring pixel values on the upper side of the chroma block may be used. Specifically, when the odd-numbered reconstructed neighboring pixel values are used among all the reconstructed neighboring pixel values on the upper side, the reconstructed pixel values at positions (0, 1), (0, 3), (0, 5), and (0, 7) may be used.

The luma block may undergo the down-sampling operation so as to correspond to the chroma block, and then, only a part of the reconstructed neighboring pixels thereof may be used. In other words, when odd-numbered (or even-numbered) reconstructed pixel values of the reconstructed neighboring pixel values on the upper side of the chroma block are used, the corresponding four reconstructed neighboring pixels of the luma block are down-sampled using the filter of Equation 7, and then the result value from the down-sampling are used for the CCLM. Specifically, when odd-numbered reconstructed pixel values (first, third, fifth, seventh pixel values) among the reconstructed neighboring pixel values on the upper side the chroma block are used, the luma block is processed by down-sampling, with the 4-tap filter of Equation 7, 4 reconstructed neighboring luma pixels (reconstructed pixels at positions (0,2), (0,3), (1,2), and (1,3)) corresponding to the fist reconstructed neighboring pixel of the chroma block, 4 reconstructed neighboring luma pixels (reconstructed pixel at positions (0,6), (0,7), (1,6), and (1,7)) corresponding to the third reconstructed neighboring pixel of the chroma block, 4 reconstructed neighboring luma pixels (reconstructed pixel at positions (0,10), (0,11), (1,10), and (1,11)) corresponding to the fifth reconstructed neighboring pixel of the chroma block, and 4 reconstructed neighboring luma pixels (reconstructed pixel at positions ((0,14), (0,15), (1,14), and (1,15)) corresponding to the seventh reconstructed neighboring pixel of the chroma block.

Figure 8:
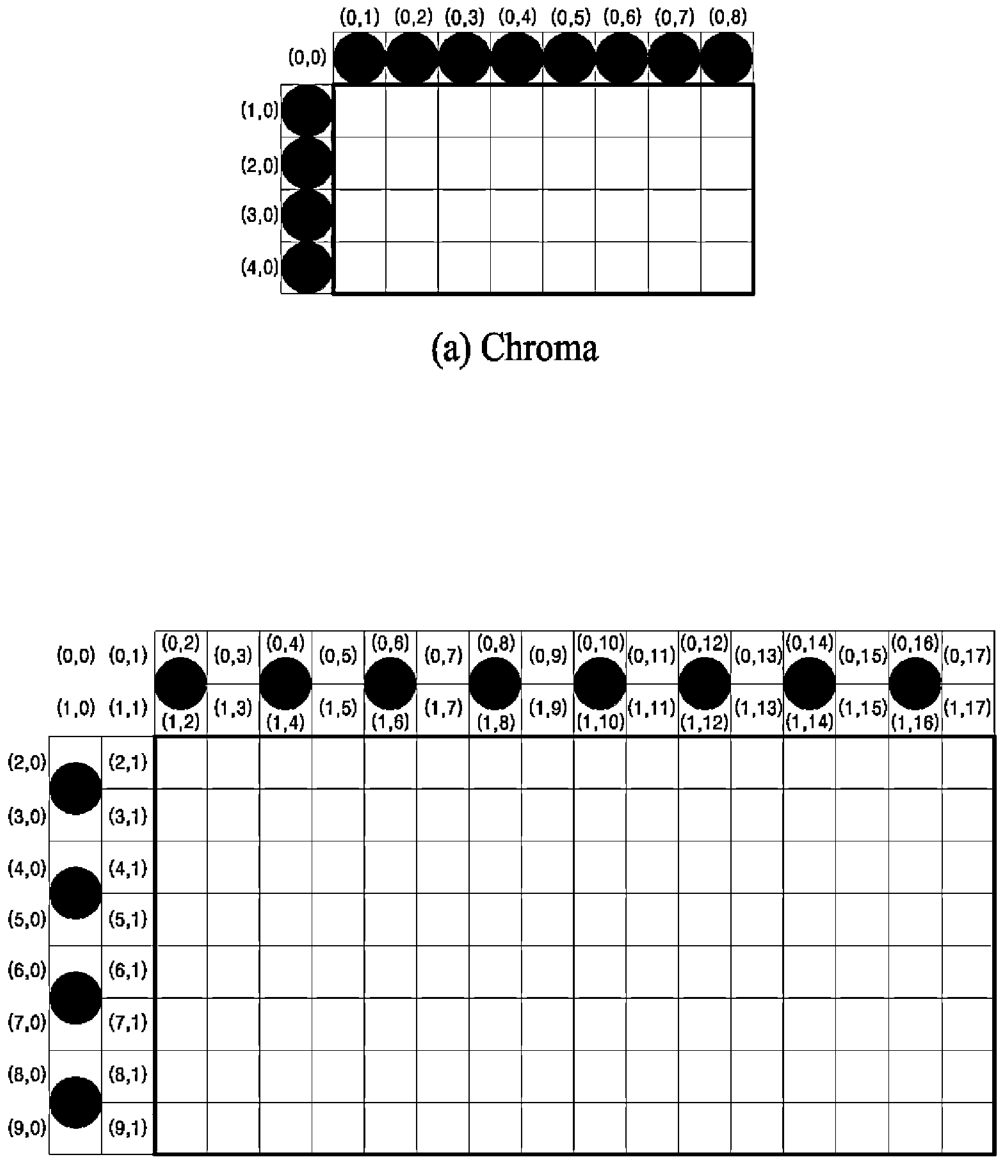
FIG. 8 shows samples used for a CCLM in predicting a block according to a second embodiment of the present disclosure.

FIG. 8 shows samples used for a CCLM in predicting a block according to a second embodiment of the present disclosure. In the second embodiment, the number of all the reconstructed pixels on the left and upper sides of the chroma block is determined as the sampling number.

In FIG. 8, (a) shows a chroma block, and (b) shows a luma block. According to the second embodiment of the present disclosure, in Equation 1, N may be set to a value obtained by adding the width and height of the chroma block. In FIG. 8, samples used for the CCLM according to the second embodiment of the present disclosure are indicated by circles (○). Referring to FIG. 8, all the reconstructed neighboring pixel values on the upper and left sides of the chroma block are used, whereas the reconstructed neighboring pixel values of the luma block may be down-sampled to correspond to the chroma block. That is, four reconstructed neighboring luma pixels corresponding to one reconstructed neighboring pixel of the chroma block are down-sampled using the filter of Equation 7, and then the down-sampled pixel value is used for a CCLM (See the first embodiment).

Figure 9:
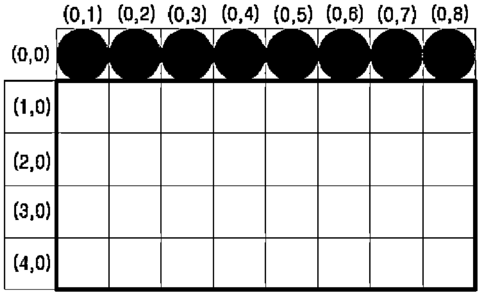
FIG. 9 shows samples used for a CCLM in predicting a block according to a third embodiment of the present disclosure.
Figure 9:
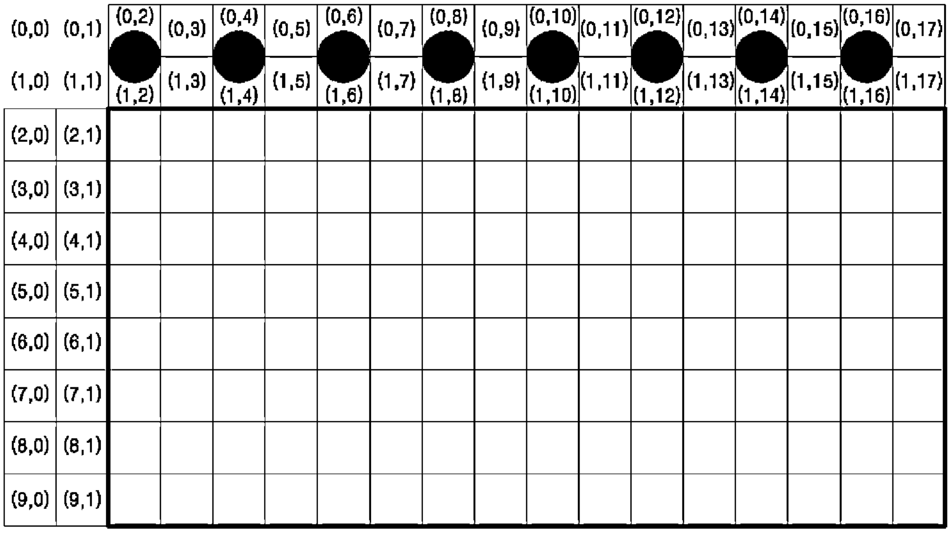

FIG. 9 shows samples used for a CCLM in predicting a block according to a third embodiment of the present disclosure. In the third embodiment, only the reconstructed neighboring pixel values on one side (either the left or upper side) of the chroma block and the luma block are sampled and used for the CCLM. Here, whether to use the reconstructed neighboring pixel values on the left side or the reconstructed neighboring pixel values on the upper side may be inferred from the shape of the block. For example, when a block width is greater than a block height, only the reconstructed neighboring pixel values on the upper side may be used. Alternatively, only the reconstructed neighboring pixel values on the left side may be used. In addition, information on whether to use the reconstructed neighboring pixel values on the left side or the reconstructed neighboring pixel values on the upper side may be signaled from the video encoding apparatus to the video decoding apparatus.

In FIG. 9, (a) shows a chroma block, and (b) shows a luma block. According to the third embodiment of the present disclosure, in Equation 1, N may be set to one of the width and height of the chroma block, and an example with N set to the greater value will be described. In FIG. 9, since the width of the chroma block is greater than the height thereof, N is the width of the chroma block. In FIG. 9, samples employed for the CCLM according to the third embodiment of the present disclosure are indicated by circles (○). Referring to FIG. 9, since the width of the chroma block is greater than the height thereof, all the reconstructed neighboring pixel values on the upper side are used, whereas any of the reconstructed neighboring pixel values on the left side is not used. In addition, for the luma block, any of the reconstructed neighboring pixel values on the left side is not used, whereas the reconstructed neighboring pixels on the upper side are down-sampled to correspond to the reconstructed neighboring pixels of the chroma block. That is, four reconstructed neighboring luma pixels corresponding to one reconstructed neighboring pixel value of the chroma block are down-sampled using the filter of Equation 7, and then the down-sampled pixel value is employed for the CCLM (See the first embodiment).

Such an embodiment may be applied when the greater one of the width, which corresponds to the horizontal axis, and the height, which corresponds to the vertical axis, of the current block has a stronger influence. In contrast, when the smaller one of the width and the height of the current block has a stronger influence, the smaller one may form the basis of application. In addition, information indicating a direction having a stronger influence between the horizontal axis and the vertical axis may be transmitted to allow the decoder to determine whether to use the reconstructed pixel values on the left side or the upper side.

Figure 10:
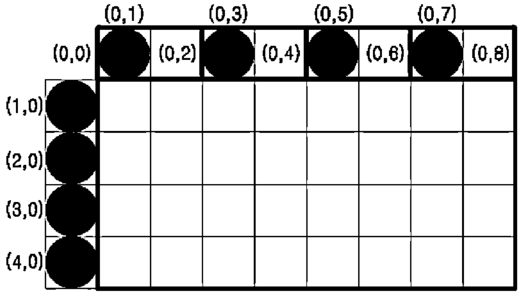
FIG. 10 shows samples used for a CCLM in predicting a block according to a fourth embodiment of the present disclosure.
Figure 10:
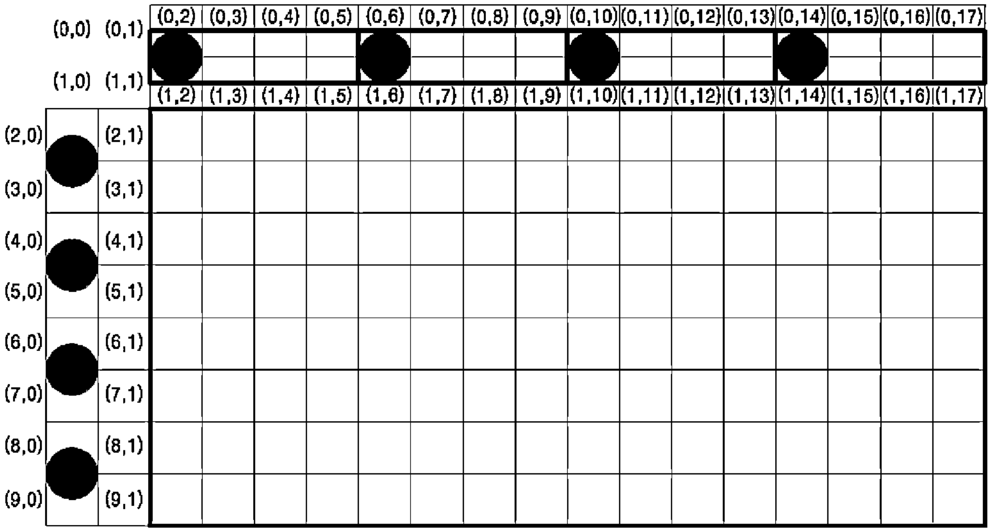

FIG. 10 shows samples used for a CCLM in predicting a block according to a fourth embodiment of the present disclosure. In the fourth embodiment, the sampling number of reconstructed pixels is determined based on the smaller one of the width and height of a chroma block. When the width and height of the chroma block are equal to each other, the sampling number may be set to any of the width and the height.

In FIG. 10, (a) shows a chroma block, and (b) shows a luma block. According to the fourth embodiment of the present disclosure, in Equation 1, N may be set to a value twice the smaller one of the width and height of the chroma block. In FIG. 10, since the height of the chroma block is less than the width thereof, N is twice the height of the chroma block. In FIG. 10, samples employed for the CCLM according to the fourth embodiment of the present disclosure are indicated by circles (○). Referring to FIG. 10, since the height of the chroma block is less than the width thereof, all the reconstructed neighboring pixel values on the left side may be used, while only a portion of the reconstructed neighboring pixel values on the upper side may be used through a down-sampling operation. In this case, among the reconstructed neighboring pixels on the upper side, the reconstructed pixels at positions (0,1) and (0,2), the I reconstructed pixels at positions (0,3) and (0,4), the reconstructed pixels at positions (0,4) and (0,5), and the reconstructed pixels at positions (0,6) and (0,7) are down-sampled, respectively.

For the luma block, the reconstructed neighboring pixels on the left side may be down-sampled using a 4-tap filter to correspond to the reconstructed neighboring pixels on the left side of the chroma block, and the reconstructed neighboring pixels on the upper side may be down-sampled using an 8-tap filter. As exemplified above, it is assumed that a first value is generated by down-sampling the reconstructed pixel values at positions (0,1) and (0,2) among the reconstructed neighboring pixel values on the upper side of the chroma block, and a second value is generated by down-sampling the reconstructed pixel value at positions (0,3) and (0,4). In this case, the reconstructed neighboring pixels of the luma block at positions (0,2), (0,3), (0,4), (0,5), (1,2), (1,3), (1,4), and (1,5) corresponding to the first value may be down-sampled using an 8-tap filter, and the reconstructed neighboring pixels of the luma block at positions (0,6), (0,7), (0,8), (0,9), (1,6), (1,7), (1,8), and (1,9) corresponding to the second value may be down-sampled using the 8-tap filter.

Figure 11:
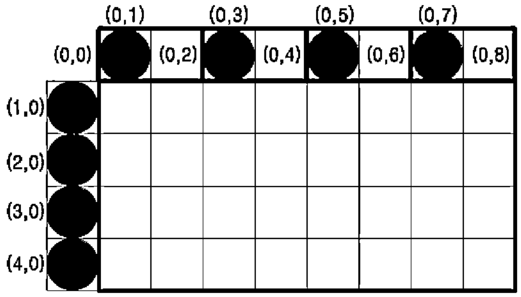
FIG. 11 shows samples used for a CCLM in predicting a block according to a fifth embodiment of the present disclosure.
Figure 11:
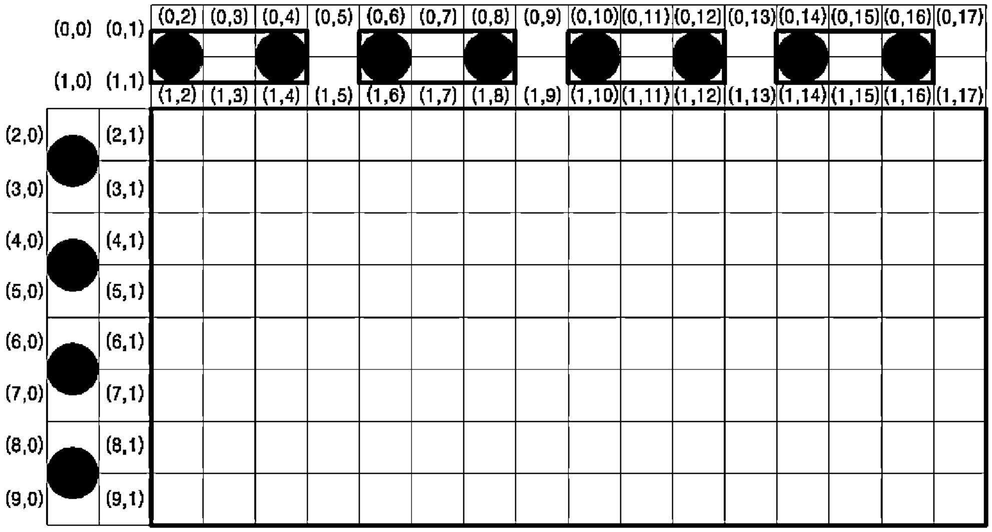

FIG. 11 shows samples used for a CCLM in predicting a block according to a fifth embodiment of the present disclosure. In the fifth embodiment, the sampling number of reconstructed pixels is determined based on the smaller one of the width and height of a chroma block. When the width and height of the chroma block are equal to each other, the sampling number may be set to any of the width and the height.

In FIG. 11, (a) shows a chroma block, and (b) shows a luma block. According to the fifth embodiment of the present disclosure, in Equation 1, N may be set to a value twice the smaller one of the width and height of the chroma block. In FIG. 11, since the height of the chroma block is less than the width thereof, N is twice the height of the chroma block. In FIG. 11, samples employed for the CCLM according to the fifth embodiment of the present disclosure are indicated by circles (○). Referring to FIG. 11, since the height of the chroma block is less than the width thereof, all the reconstructed neighboring pixels on the left side are used, whereas the reconstructed neighboring pixels on the upper side are down-sampled and used as in the fourth embodiment described above.

For the luma block, the reconstructed neighboring pixel values on the left side may be down-sampled using a 4-tap filter to correspond to the reconstructed neighboring pixel values on the left side of the chroma block, and the reconstructed neighboring pixel values on the upper side may be down-sampled twice. For example, in order to obtain a reconstructed neighboring pixel value on the upper side of the luma block corresponding to the reconstructed pixel value at position (0,1) among the reconstructed neighboring pixel values on the upper side of the chroma block, reconstructed pixels at positions (0,2), (0,3), (1,2), and (1,3) among the reconstructed neighboring pixel values on the upper side of the luma block are down-sampled using the 4-tap filter of Equation 7. In order to obtain a reconstructed neighboring pixel value on the upper side of the luma block corresponding to the reconstructed pixel value at position (0,2) among the reconstructed neighboring pixel values on the upper side of the chroma block, the reconstructed pixels at positions (0,4), (0,5), (1,4), and (1,5) on the upper side of the luma block are down-sampled using the 4-tap filter of Equation 7. After all the down-sampled reconstructed pixel values on the upper side of the luma blocks corresponding to, all the reconstructed neighboring pixel values on the upper side of the chroma block are obtained through the primary down-sampling operation, two down-sampled reconstructed pixel values on the upper side of the luma block corresponding to the reconstructed pixel values at positions (0,1) and (0,2) on the upper side of the chroma block are down-sampled again using the 2-tap filter through a secondary down-sampling operation.

Hereinafter, a method of predicting Cr from Cb using a CCLM will be described in detail. It is apparent that a method of predicting Cb from Cr using the present disclosure is also possible. When a CCLM is used, Cr may be obtained from Cb using Equation 8 given below.

$$pred^{*}_{Cr}(i,\ j) = pred_{Cr}(i,\ j) + \alpha \cdot resi'_{Cb}(i,\ j). \qquad \text{Equation 8}$$

$$\alpha = \frac{N \cdot \sum(Cb(n) \cdot Cr(n)) - \sum Cb(n) \cdot \sum Cr(n) + \lambda \cdot (-0.5)}{N \cdot \sum(Cb(n) \cdot Cb(n)) - \sum Cb(n) \cdot \sum Cb(n) + \lambda}.$$

where $pred_{Cr}$(i,j) is the pixel value of the prediction block for the current coding target Cr block, and $resi_{Cb}$'(i,j) is the residual signal of a reconstructed residual block for the current coding target Cb block. Cb(n) denotes a reconstructed neighboring Cb sample value, Cr(n) denotes a reconstructed neighboring Cr sample value, and λ is Σ(Cb (n)·Cb(n))>>9.

Hereinafter, a method of predicting Cr from Cb for a target block according to the present disclosure will be described.

Figure 12:
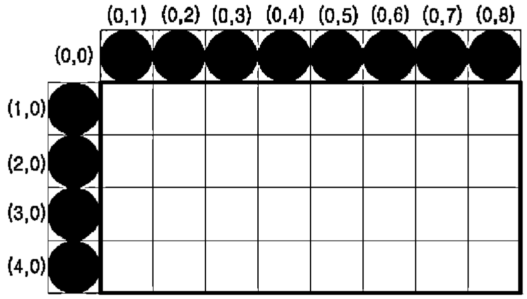
FIG. 12 shows samples used for a CCLM in predicting a block according to a sixth embodiment of the present disclosure.
Figure 12:
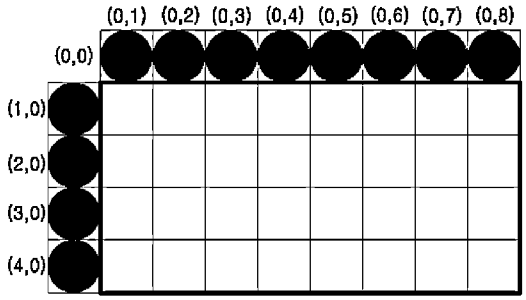

FIG. 12 shows samples used for a CCLM in predicting a block according to a sixth embodiment of the present disclosure. In the sixth embodiment, the number of all reconstructed neighboring pixels on the left and the upper side of a Cb block (or Cr block) is determined as the sampling number.

In FIG. 12, (a) shows a Cr block, and (b) shows a Cb block. According to the sixth embodiment of the present disclosure, in Equation 8, N may be set to a value obtained by adding the width and height of the Cr block. In FIG. 12, samples employed for the CCLM according to the sixth embodiment of the present disclosure are indicated by circles (○). That is, all the reconstructed neighboring pixel values on the left and the upper side of the Cr block and the Cb block may be used to obtain a in Equation 8.

Figure 13:
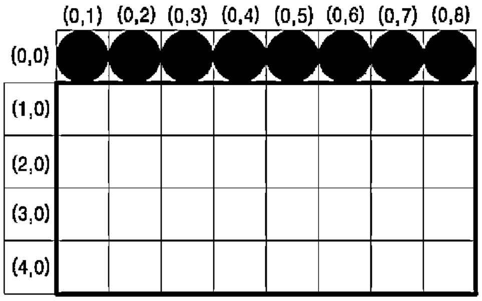
FIG. 13 shows samples used for a CCLM in predicting a block according to a seventh embodiment of the present disclosure.
Figure 13:
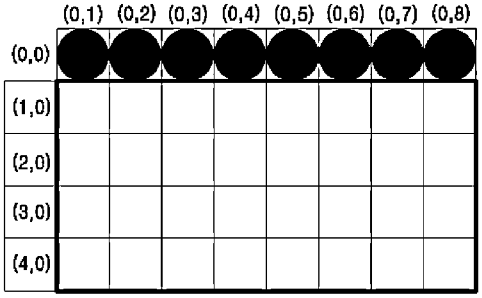

FIG. 13 shows samples used for a CCLM in predicting a block according to a seventh embodiment of the present disclosure. In the seventh embodiment, only the reconstructed pixels on one side (either the left or upper side) among the reconstructed neighboring pixels of the Cb block and the Cr block are sampled and employed for a CCLM. Here, whether to use the reconstructed neighboring pixel values on the left side or the reconstructed neighboring pixel values on the upper side may be inferred from the shape of the block. For example, when a block width is greater than block height, only the reconstructed neighboring pixel values on the upper side may be used. Alternatively, only the reconstructed neighboring pixel values on the left side may be used. In addition, information on whether to use the reconstructed signaled from the video encoding apparatus to the video decoding apparatus pixel values on the left side or the reconstructed neighboring pixel values on the upper side may be signaled from the video encoding apparatus to the video decoding apparatus.

As in FIG. 12, in FIG. 13, (a) shows a Cr block, and (b) shows a Cb block. According to the seventh embodiment of the present disclosure, in Equation 8, N may be set to the greater one of the width and height of the Cr block. In FIG. 13, samples employed for the CCLM according to the seventh embodiment of the present disclosure are indicated by circles (○). That is, all the reconstructed neighboring pixel values on the upper side of the Cr block and the Cb block may be used to obtain a in Equation 8.

Figure 14:
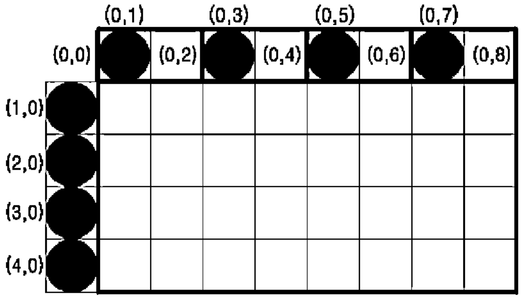
FIG. 14 shows samples used for a CCLM in predicting a block according to an eighth embodiment of the present disclosure.
Figure 14:
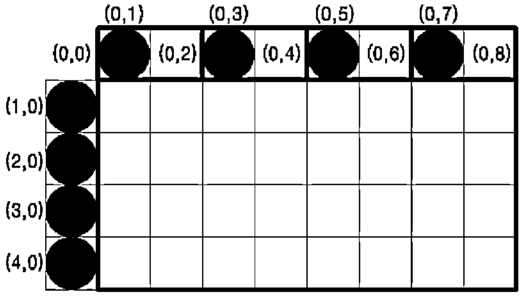

FIG. 14 shows samples used for a CCLM in predicting a block according to an eighth embodiment of the present disclosure. In the eighth embodiment, the sampling number of the reconstructed neighboring pixels is determined based on the smaller one of the width and height of the Cb block (or the Cr block). When the width and height of the Cb block (or the Cr block) are equal to each other, N may be set to any of the width and the height.

As in FIGS. 12 and 13, in FIG. 14, (a) shows a Cr block, and (b) shows a Cb block. According to the eighth embodiment of the present disclosure, in Equation 8, N may be set to a value twice the smaller one of the width and height of the Cr block. In FIG. 14, since the height of the Cr block is less than the width thereof, N is twice the height of the Cr block. In FIG. 14, samples employed for the CCLM according to the eighth embodiment of the present disclosure are indicated by circles (○). That is, since the height of the Cr block and the Cb block is less than the width thereof, all the reconstructed neighboring pixel values on the left side are used to obtain a in Equation 8, whereas the reconstructed neighboring pixels von the upper side of the Cr block and Cb block are down-sampled and used to obtain a in Equation 8. FIG. 14 illustrates an example in which the reconstructed pixels at positions (0,1) and (0,2), the reconstructed pixels at positions (0,3) and (0,4), the reconstructed pixels at positions (0,5) and (0,6), and the reconstructed pixels vat positions (0,7) and (0,8) among the reconstructed neighboring pixels on the upper side of the Cr block and the Cb block are down-sampled, respectively, and used to obtain a in Equation 8. Here, the down-sampling may be performed using various methods (for example, a 2-tap filter, etc.).

Figure 15:
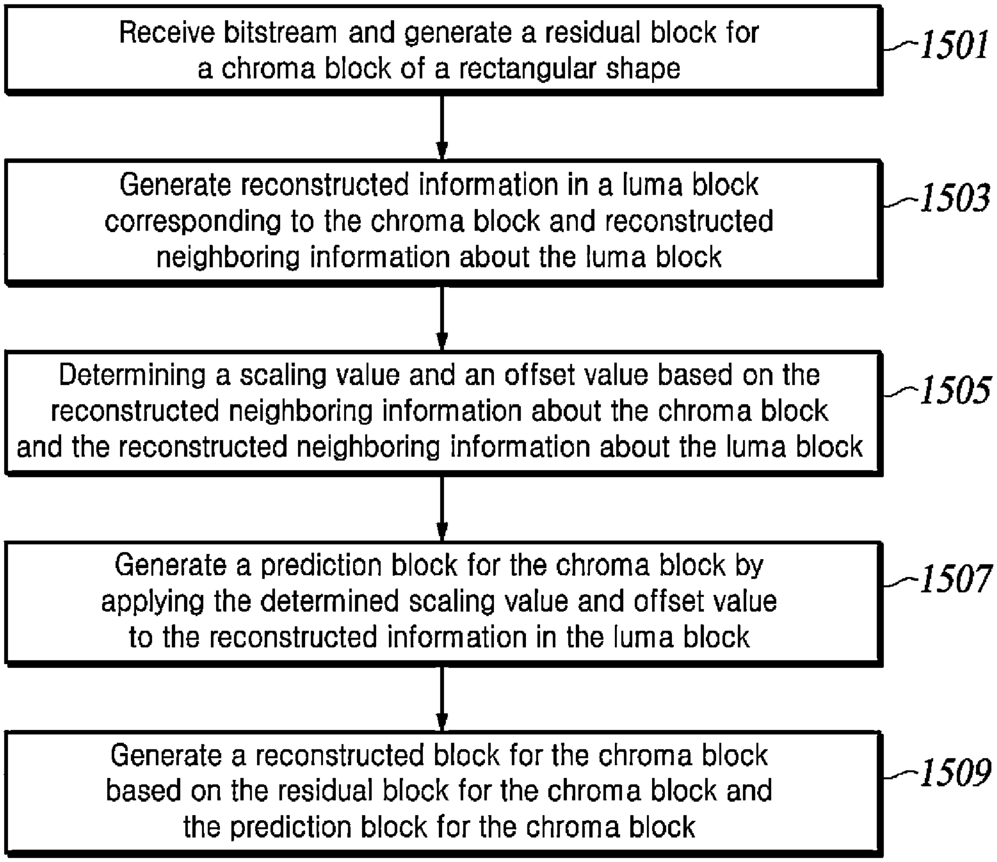
FIG. 15 is a flowchart illustrating a video decoding method according to the present disclosure.

FIG. 15 is a flowchart illustrating a video decoding method according to the present disclosure.

In the method of decoding the video by predicting a target block, the video decoding apparatus initially receives a bitstream and generates a residual block for a chroma block (1501).

The video decoding apparatus also generates reconstructed information in a luma block corresponding to the chroma block and reconstructed neighboring information about the luma block (1503). Alternatively, the apparatus may receive the information. The apparatus may also receive reconstructed neighboring information about the chroma block.

The video decoding apparatus determines a scaling value and an offset value based on the reconstructed neighboring information about the chroma block and the reconstructed neighboring information about the luma block (1505). Further, the scaling value and the offset value may be determined further considering information included in the bitstream.

A prediction block for the chroma block is generated by applying the determined scaling value and offset value to the reconstructed information in the luma block (1507). The prediction block for the chroma block may be determined by a correlation between the reconstructed neighboring information about the luma block and the reconstructed neighboring information about the chroma block. Information related to the correlation may be transmitted from the video encoding apparatus to the video decoding apparatus.

The video decoding apparatus generates a reconstructed block of the chroma block based on the residual block for the chroma block and the prediction block for the chroma block (1509).

The video decoding apparatus may decode a picture using the reconstructed blocks.

While FIG. 15 illustrates the video decoding method for predicting chroma from luma, the same principle may be applied even to a video decoding method for predicting Cr from Cb.

While operations 1501 to 1507 are described in FIG. 15 as being sequentially executed, this is merely illustrative of the technical idea of one embodiment of the present disclosure. In other words, a person having ordinary skill in the technical field to which one embodiment of the present disclosure pertains will appreciate that various modifications and variations can be made to execute operations 1501 to 1507 disclosed in FIG. 15 in a different order or to execute one or more of operations 1501 to 1507 in parallel without departing from the essential characteristics of one embodiment of the present disclosure. Accordingly, FIG. 15 is not limited to the sequential order.

The steps shown in FIG. 15 may be implemented as a computer program, and may be recorded on a non-transitory computer-readable medium. The computer-readable recording medium includes any type of recording devices on which data that may be read by a computer system are recordable. Examples of the computer-readable recording medium include a magnetic storage medium (e.g., a ROM, a floppy disk, a hard disk, etc.), an optically readable medium (e.g., CD-ROM, DVD, etc.) and carrier waves (e.g., transmission through the Internet). Further, an example computer-readable recording medium has computer-readable codes that may be stored and executed in a distributed manner in computer systems connected over a network.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereto.

What is claimed is:

1. A video decoding apparatus, comprising at least one processor configured to:

decode, from a bitstream, a flag indicating whether a Cross Component Linear Model (CCLM) is allowed to a chroma block;

determine a residual block of the chroma block from the bitstream;

generate downsampled luma samples of a luma block corresponding to the chroma block from reconstructed luma samples of the luma block;

determine, from the bitstream, information indicating one set to be used for generating downsampled neighboring luma samples of the luma block from among three available sets of reconstructed neighboring luma samples, wherein the three available sets include i) a set of reconstructed neighboring luma samples in left columns adjacent to the luma block, ii) a set of reconstructed neighboring luma samples in upper rows adjacent to the luma block, and iii) a set of reconstructed neighboring luma samples in the left columns and the upper rows adjacent to the luma block;

generate the downsampled neighboring luma samples of the luma block based on the one set, indicated by the information, from among the three available sets;

determine reconstructed neighboring chroma samples corresponding to the downsampled neighboring luma samples of the luma block;

determine parameters of the CCLM based on the reconstructed neighboring chroma samples and the downsampled neighboring luma samples;

generate a prediction block of the chroma block from the downsampled luma samples of the luma block based on the parameters of the CCLM; and generate a reconstructed block for the chroma block based on the residual block of the chroma block and the prediction block of the chroma block.

2. The video decoding apparatus of claim 1, wherein a sampling format of the chroma block and the luma block is a YUV 4:2:0 format.

3. The video decoding apparatus of claim 1, wherein a number of downsampled neighboring luma samples of the luma block is equal to i) a sum of a width and a height of the chroma block, ii) twice the width of the chroma block, or iii) twice the height of the chroma block.

4. The video decoding apparatus of claim 1, wherein the at least one processor is further configured to:

determine, from the bitstream, information that specifies one downsampling filter to use for generating the downsampled neighboring luma samples of the luma block from among a plurality of available downsampling filters.

5. A video encoding apparatus, comprising at least one processor configured to:

encode, into a bitstream, a flag indicating whether a Cross Component Linear Model (CCLM) is allowed to a chroma block;

generate downsampled luma samples of a luma block corresponding to the chroma block from reconstructed luma samples of the luma block;

encode, into the bitstream, information indicating one set to be used for generating downsampled neighboring luma samples of the luma block from among three available sets of reconstructed neighboring luma samples, wherein the three available sets include i) a set of reconstructed neighboring luma samples in the left columns adjacent to the luma block, ii) a set of reconstructed neighboring luma samples in the upper rows adjacent to the luma block, and iii) a set of reconstructed neighboring luma samples in the left columns and the upper rows adjacent to the luma block;

generate the downsampled neighboring luma samples of the luma block based on the one set, indicated by the information, from among the three available sets;

determine reconstructed neighboring chroma samples corresponding to the downsampled neighboring luma samples of the luma block;

determine parameters of the CCLM based on the downsampled neighboring luma samples and the reconstructed neighboring chroma samples;

generate a prediction block of the chroma block from the downsampled luma samples of the luma block based on the parameters of the CCLM;

determine a residual block of the chroma block based on the prediction block of the chroma block; and encode the residual block of the chroma block into the bitstream.

6. The video encoding apparatus of claim 5, wherein a sampling format of the chroma block and the luma block is a YUV 4:2:0 format.

7. The video encoding apparatus of claim 5, wherein a number of downsampled neighboring luma samples of the luma block is equal to i) a sum of a width and a height of the chroma block, ii) twice the width of the chroma block, or iii) twice the height of the chroma block.

8. The video encoding apparatus of claim 5, wherein the at least one processor is further configured to:

encode, into the bitstream, information that specifies one downsampling filter to use for generating the downsampled neighboring luma samples of the luma block from among a plurality of available downsampling filters.

9. An apparatus for providing a video decoding device with video data, the apparatus comprising at least one processor configured to:

encode the video data into a bitstream; and transmit the bitstream to the video decoding device, wherein the at least one processor is configured to encode the video data by:

encoding, into the bitstream, a flag indicating whether a Cross Component Linear Model (CCLM) is allowed to a chroma block;

generating downsampled luma samples of a luma block corresponding to the chroma block from reconstructed luma samples of the luma block;

encoding, into the bitstream, information indicating one set to be used for generating downsampled neighboring luma samples of the luma block from among three available sets of reconstructed neighboring luma samples, wherein the three available sets include i) a set of reconstructed neighboring luma samples in the left columns adjacent to the luma block, ii) a set of reconstructed neighboring luma samples in the upper rows adjacent to the luma block, and iii) a set of reconstructed neighboring luma samples in the left columns and the upper rows adjacent to the luma block;

generating the downsampled neighboring luma samples of the luma block based on the one set, indicated by the information, from among the three available sets;

determining reconstructed neighboring chroma samples corresponding to the downsampled neighboring luma samples of the luma block;

determining parameters of the CCLM based on the downsampled neighboring luma samples and the reconstructed neighboring chroma samples;

generating a prediction block of the chroma block from the downsampled luma samples of the luma block based on the parameters of the CCLM;

determining a residual block of the chroma block based on the prediction block of the chroma block; and encoding the residual block of the chroma block into the bitstream.

10. The apparatus of claim 9, wherein a sampling format of the chroma block and the luma block is a YUV 4:2:0 format.

11. The apparatus of claim 9, wherein a number of downsampled neighboring luma samples of the luma block is equal to i) a sum of a width and a height of the chroma block, ii) twice the width of the chroma block, or iii) twice the height of the chroma block.

12. The apparatus of claim 9, wherein the at least one processor is further configured to:

encode, into the bitstream, information that specifies one downsampling filter to use for generating the downsampled neighboring luma samples of the luma block from among a plurality of available downsampling filters.

* * * * *